United States Patent [19]

Cerra, Jr. et al.

[11] Patent Number: 5,432,386
[45] Date of Patent: Jul. 11, 1995

[54] BATTERY BACK-UP CONTROL CIRCUIT FOR BATTERY BACKED UP RACK MOUNTED DEVICES

[75] Inventors: Patrick A. Cerra, Jr., Endicott, N.Y.; Charles V. Zenz, Sr., Rochester, Minn.

[73] Assignee: International Business Machines Corporation, Armonk, N.Y.

[21] Appl. No.: 966,306

[22] Filed: Oct. 26, 1992

[51] Int. Cl.⁶ .............................................. H02B 1/00
[52] U.S. Cl. ..................... 307/66; 340/501; 340/517; 361/690
[58] Field of Search ............ 307/64, 65, 66, 85, 307/86, 87; 340/501, 517; 361/383

[56] References Cited

U.S. PATENT DOCUMENTS

| | | | |
|---|---|---|---|
| 4,167,003 | 9/1979 | Stansbury | 340/501 |
| 4,401,894 | 8/1983 | Weisner | 307/64 |
| 4,426,587 | 1/1984 | Nouet | 307/66 |
| 4,528,458 | 7/1985 | Nelson et al. | 307/64 |
| 4,528,459 | 7/1985 | Wiegel | 307/66 |
| 4,587,640 | 5/1986 | Saitoh | 365/229 |
| 4,615,009 | 9/1986 | Battocletti et al. | 364/483 |
| 4,675,538 | 6/1987 | Epstein | 307/64 |
| 4,691,274 | 9/1987 | Matouk et al. | 363/141 |
| 4,757,505 | 7/1988 | Marrington et al. | 371/66 |
| 4,791,362 | 12/1988 | Philpot | 324/142 |
| 5,216,579 | 6/1993 | Basara et al. | 361/383 |
| 5,247,205 | 9/1993 | Mototani et al. | 307/66 |

Primary Examiner—Jeffrey A. Gaffin
Assistant Examiner—Peter Ganjoo
Attorney, Agent, or Firm—Eugene I. Shkurko

[57] ABSTRACT

Methods and apparatus are set forth for automatically controlling a battery back-up unit (BBU) associated with a rack mounted device, under rack A.C. power outage, rack Emergency Power Off (EPO) and normal rack power down conditions. The methods and apparatus contemplated by the invention deactivate the device BBU whenever either a rack Emergency Power Off (EPO) or normal rack power down condition exists so that BBU power is not unnecessarily drained. The invention features the ability to perform the aforestated device BBU control function without having to redesign a rack enclosure, and without having to use or generate rack signals other than "non-specific" signals, defined as signals that are being generated and used for purposes other than device level BBU switching in a commercially available rack enclosure.

26 Claims, 9 Drawing Sheets

EPO CONDITION AND NORMAL RACK DOWN SEQUENCE (1) DPO (ISSUED FROM EPO OR POWER OFF SIGNAL)

(2) A.C.

(3) 250 ms TIMER
|←--APPROX--→|
 250 ms (4) 500 ms TIMER
BIAS ACTIVE, NOT TRIGGERED
OUTPUT LOW

OUTPUT TIMER RESET SIGNAL
HIGH LEVEL, TRIGGER READY (5) OUTPUT TIMER
|←--------APPROX--------→|
         60 SEC (6) BBU INACTIVE/K2 RESET
K2 CONTACTS OPEN
|←--60 SEC OR UNTIL BULK HAS DECAYED--→|

FIG. 6

BATTERY BACK-UP CONTROL CIRCUIT FOR BATTERY BACKED UP RACK MOUNTED DEVICES

BACKGROUND OF THE INVENTION

The invention relates generally to methods and apparatus (control circuitry) for controlling a battery back-up unit (BBU) associated with a rack mounted device, under rack A.C. power outage, rack Emergency Power Off (EPO) and normal rack power down conditions. Examples of such devices include tape drives, hard discs, processors, and the like, which are typically rack mounted in general purpose digital computing systems.

More particularly, the invention relates to a device BBU control circuit which can distinguish between a rack A.C. power outage and both rack EPO and normal rack power down conditions (1) to permit the device BBU to supply device power whenever an A.C. Power outage condition exists; and (2) to deactivate the device BBU whenever either a rack EPO or normal rack power down condition exists.

Battery backed up uninterruptible power supplies are well known to those skilled in the art and are described, for example, in U.S. Pat. No. 4,675,538, issued Jun. 23, 1987, to Epstein, entitled "General Purpose Uninterruptible Power Supply". Such power supplies may have their battery back-up capability switched on during the failure of a primary power source (e.g., a commercial A.C. power source), or operated in parallel with the primary source to compensate for transients induced by, for example, noise, surges, etc.

Other types of methods and apparatus are known which rely on battery back-up capabilities to assure the continuous supply of power to (1) a system as a whole; (2) to architected system components (such as racks and other types of modules which together form a system); and (3) to individual devices included in racks. Examples of such methods and apparatus include those employed in multi-level power distribution systems, telephone networks and computing systems, several of which are taught in the issued U.S. Patents described immediately hereinafter.

In particular, U.S. Pat. No. 4,426,587, issued Jan. 17, 1981, to Nouet, entitled "Power Distribution System", describes a multi-level power supply distribution system, including a battery backed up rack level set of power supplies for providing power to the rack level of the system.

U.S. Pat. No. 5,587,640, issued May 6, 1986, to Saitoh, entitled "Cassette Type Semiconductor Memory Device", describes a cassette type memory device that includes a battery backed up RAM.

U.S. Pat. No. 4,757,505, issued Jul. 12, 1988, to Marrington et al., entitled "Computer Power System", describes a back-up computer power system that includes an auxiliary power supply which facilitates the controllable shut down of a computer so that normal operation can be resumed once the main source of power is restored.

U.S. Pat. No. 4,528,458, issued Jul. 9, 1985, to Nelson et al. entitled "Self-Diagnostic Redundant Modular Power Supply", describes a redundant modular power supply having a plurality of modules, at least one of which includes test apparatus for detecting module failures.

U.S. Pat. No. 4,691,274, issued Sep. 1, 1987, to Matouk et al., entitled "Modular Electronic Power Supply", describes a reliable modular electronic power supply adapted for use in computer systems.

U.S. Pat. No. 4,615,009, issued Sep. 30, 1986, to Battocletti et al., entitled "Electronic Energy And Power Monitoring Apparatus" and U.S. Pat. No. 4,791,362, issued Dec. 18, 1988, to Philpot, entitled "Modularized Solid State Register", describe assemblies for monitoring or metering a plurality of electrical energy and power parameters.

The aforementioned patents, which illustrate state of the art systems that include battery back-up features, including battery back-up control and monitoring systems, do not teach, claim or even suggest methods or apparatus for controlling a BBU associated with a rack mounted device under rack A.C. power outage, rack EPO and normal rack power down conditions (sometimes referred to hereinafter collectively as "rack power conditions").

The ability to effect such control based on the aforementioned rack power conditions would be desirable (1) to permit a BBU associated with a rack installed device to supply device power whenever an A.C. power outage condition exists; and (2) to deactivate the device BBU whenever either a rack EPO or normal rack power down condition exists.

Presently, rack mounted battery backed up devices (i.e., devices with a battery back-up (BBU) feature), have no way of distinguishing a rack EPO condition or normal rack power down condition, from a rack A.C. power outage condition. As a consequence, when commercially available rack enclosures (enclosures capable of housing and being connected to devices having BBU features), experience a normal rack power down or rack EPO condition, the BBUs in any battery backed up devices installed in the rack will provide device power until either being manually deactivated or depleted.

While devices themselves are known which (1) have an EPO switch and a BBU feature, and which (2) are able to distinguish between the device's EPO switch being depressed and power to the device being otherwise interrupted; such capability is not known to extend out beyond the device itself and up the system hierarchy to at least to the rack level.

Accordingly, it would be desirable to provide methods and apparatus for automatically distinguishing a rack EPO condition or normal rack power down condition, from a rack A.C. power outage condition system so that (1) rack mounted devices having a BBU feature do not have their BBUs unnecessarily drained under normal rack power down and rack EPO conditions; and (2) BBU power is permitted to energize a rack installed battery backed up device during rack A.C. power failures.

An example of a commercially available rack enclosure in which the invention would find application is the 9309 Rack Enclosure manufactured by IBM ("IBM" is a trademark owned by the International Business Machines Corporation), which is described in IBM Publication GA24-4103-04, entitled "9309 Rack Enclosure General Information And Site Preparation Guide (Models 1 And 2)", hereby incorporated by reference.

Those skilled in the art will readily appreciate that in the illustrative IBM 9309 rack enclosure there does not exist any way of communicating to devices installed in the rack that a rack level EPO condition exists or that a normal rack shut down condition exists, i.e., conditions during which it would be desirable for a given devices BBU feature to be deactivated.

Accordingly, it would also be desirable to provide methods and apparatus for performing the aforestated device BBU control function without having to redesign the rack enclosure and/or having to generate signals other than those presently used to operate the rack itself.

In fact, it would be desirable to provide to methods and apparatus which support communication of rack power conditions to the installed device level of the system hierarchy and which perform the object device BBU control function utilizing "non-specific" signals existing in a commercially available rack. The term "non-specific signals" is defined herein to mean signals that are being generated and used for purposes other than device level BBU switching in commercially available rack enclosures, such as the aforementioned illustrative IBM 9309 rack enclosure.

SUMMARY OF THE INVENTION

Accordingly, it is a principal object of the invention to provide both methods and apparatus for controlling a battery back-up unit (BBU) associated with a rack mounted device, under rack A.C. power outage, rack Emergency Power Off (EPO) and normal rack power down conditions.

It is a further object of the invention to provide methods and apparatus which permit a BBU associated with a rack installed device to supply device power whenever a rack A.C. Power outage condition exists; and which deactivates the device BBU whenever either a rack Emergency Power Off (EPO) or normal rack power down condition exists so that BBU power is not unnecessarily drained under such conditions.

A further object of the invention is to provide methods and apparatus, suitable for practice and/or installation at the device level of a system hierarchy, for automatically distinguishing a rack EPO condition or normal rack power down condition, from a rack A.C. power outage condition.

Further objects of the invention include providing methods and apparatus for performing the aforestated device BBU control function without having to redesign a rack enclosure and/or without having to generate signals other than those presently used to operate the rack enclosure itself.

Yet another object of the invention is to provide methods and apparatus which support communication of rack power conditions to the installed device level of the system hierarchy and which perform the object device BBU control function utilizing "non-specific" signals existing in a commercially available rack enclosure, as defined hereinabove.

According to one aspect of the invention, apparatus for controlling the battery back-up unit (BBU) associated with a rack mounted device under rack A.C. power outage, rack Emergency Power Off (EPO) and normal rack power down conditions, comprises: (a) means for distinguishing between a rack A.C. power outage, and both rack EPO and normal rack power down conditions; and (b) means for deactivating the BBU whenever either a rack EPO or normal rack power down condition exists.

The means for distinguishing, according to one embodiment of the invention, includes means for monitoring certain non-specific rack signals (which may vary from rack to rack and depend on rack design), including a first signal which changes state whenever a rack A.C. power outage, rack EPO or normal rack power down condition exists, and a second signal which changes state only when an A.C. power outage condition exists; and means for determining, coupled to the means for monitoring, if a rack power condition exists that does not require battery back-up.

The particular non-specific rack signals utilized when practicing the invention in the context of an IBM 9309 rack enclosure are the IBM 9309 Primary Control Compartment (PCC) generated Delayed Power On (DPO) signal (the aforementioned "first signal") and the +5 volt PCC bias voltage signal (the aforementioned "second signal"), both described in the incorporated reference.

If it is determined that a rack power condition exists that does not require battery back-up, the means for deactivating the BBU (deactivated, according to the invention, whenever either a rack EPO or normal rack power down condition exists) can be easily realized, in an exemplary embodiment of the invention, using relay drive means coupled to a latching relay in line with a given device's BBU. The relay drive means could, for example, be used to reset said latching relay to deactivate the BBU whenever a rack power condition exists that does not require battery back-up.

Furthermore, according to the exemplary embodiment of the invention being described herein, the relay drive means could be used to maintain the latching relay in a set condition to permit the BBU to supply power to the device it is associated with whenever a rack A.C. power outage condition exists.

A further aspect of the invention is directed to incorporating means for preventing possible race conditions associated with said set of non-specific rack signals, as part of the novel circuit. Such means are necessary, for example, to prevent a BBU from being deactivated during a normal rack power down sequence when an A.C. power failure is detected before the normal power down sequence is completed.

According to an alternate embodiment of the invention, a battery back-up unit (BBU) control circuit for controlling the BBU portion of a battery backed up device mounted in a rack enclosure, under rack A.C. power outage, rack Emergency Power Off (EPO) and normal rack power down conditions, is described in the context of a rack environment where a set of non-specific rack signals, including a first non-specific signal which changes state whenever a rack A.C. power outage, rack EPO or normal rack power down condition exists, and a second non-specific signal which changes state only when an A.C. power outage condition exists, are generated within the rack enclosure.

In this context, the battery back-up unit control circuit comprises:

(a) means for coupling a first state signal to first signal expander means whenever the first non-specific signal changes state;

(b) means for coupling a second state signal to second signal expander means whenever the second non-specific signal changes state;

(c) first signal expander means, responsive to the first state signal, for outputting a first analyzer control signal after time t1;

(d) second signal expander means, responsive to the second state signal, for outputting a second analyzer control signal after time t2, where t2 is greater than t1;

(e) analyzer means, responsive to the first and second analyzer control signals, for developing a first output signal to deactivate the BBU whenever a rack EPO or normal rack power down condition exists, and for developing a second output signal for permitting the BBU to supply power to the device whenever a rack A.C. power outage condition exists; and (f) BBU control means, coupled to the analyzer means, for deactivating the BBU in response to the first output signal and for permitting the BBU to supply power to the device in response to the second output signal.

Methods for controlling the BBU associated with a rack mounted device under the rack power conditions referred to hereinabove, including but not limited to those methods implemented by the aforementioned apparatus, are also the subject of and contemplated by the instant invention.

For example, the invention contemplates a method for controlling a battery back-up unit (BBU) associated with a rack mounted device under rack A.C. power outage, rack Emergency Power Off (EPO) and normal rack power down conditions, comprising the steps of: (a) distinguishing between a rack A.C. power outage, and both rack Emergency Power Off (EPO) and normal rack power down conditions; and (b) deactivating the BBU whenever a rack EPO or normal rack power down condition exists.

The invention features methods and apparatus for automatically controlling a BBU associated with a rack mounted device, under rack A.C. power outage, rack EPO and normal rack power down conditions; which permit a BBU associated with a rack installed device to supply device power whenever a rack A.C. Power outage condition exists; and which deactivates the device BBU whenever either a rack Emergency Power Off (EPO) or normal rack power down condition exists so that BBU power is not unnecessarily drained.

Further features of the invention include methods and apparatus for performing the aforestated device BBU control function without having to redesign a rack enclosure, and without having to use or generate rack signals other than the aforementioned "non-specific" signals.

These and other objects, embodiments and features of the present invention and the manner of obtaining them will become apparent to those skilled in the art, and the invention itself will be best understood by reference to the following detailed description read in conjunction with the accompanying Drawings.

BRIEF DESCRIPTION OF THE DRAWINGS

FIG. 6 illustrates, in the form of a time oriented state diagram, the various states for control circuitry depicted in FIG. 4, resulting from either a rack EPO condition or normal rack power down condition.

DETAILED DESCRIPTION

Figure 1A:
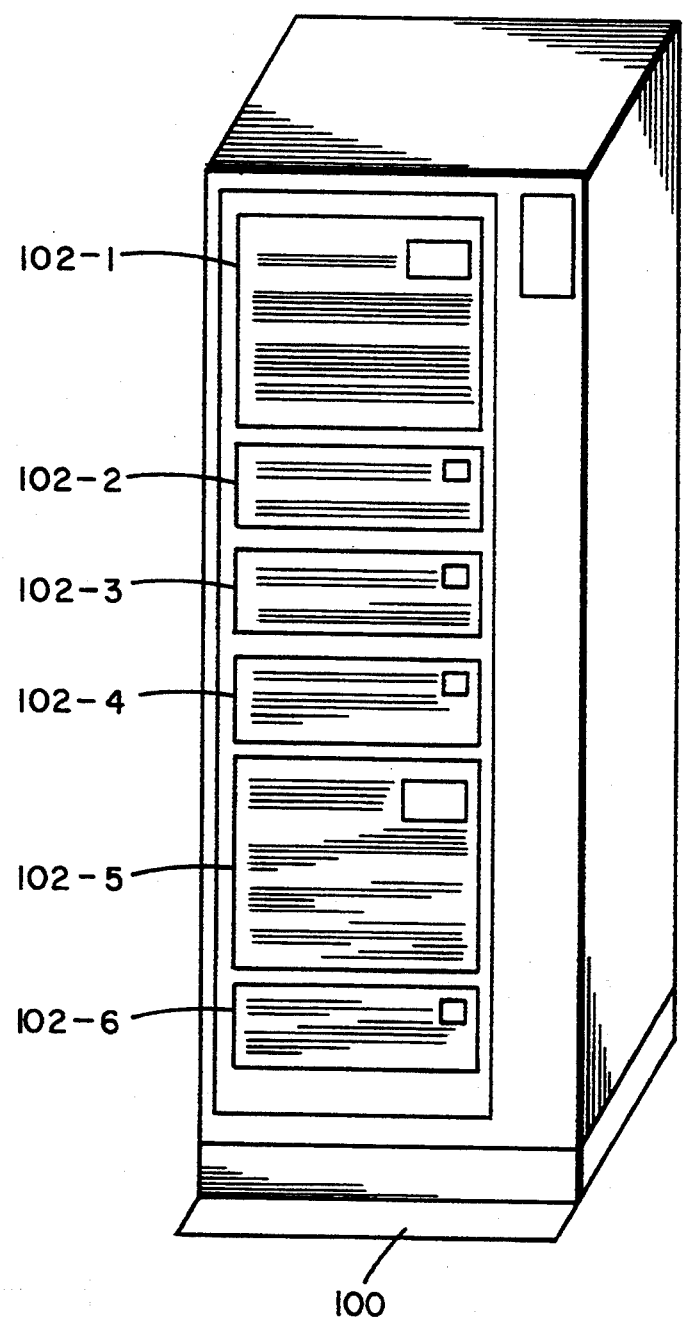
FIGS. 1A and 1B illustrate both a front and rear view of an exemplary commercially available rack enclosure (the aforementioned IBM 9309 rack enclosure) that is shown to include rack mounted devices containing BBUs.
Figure 1B:
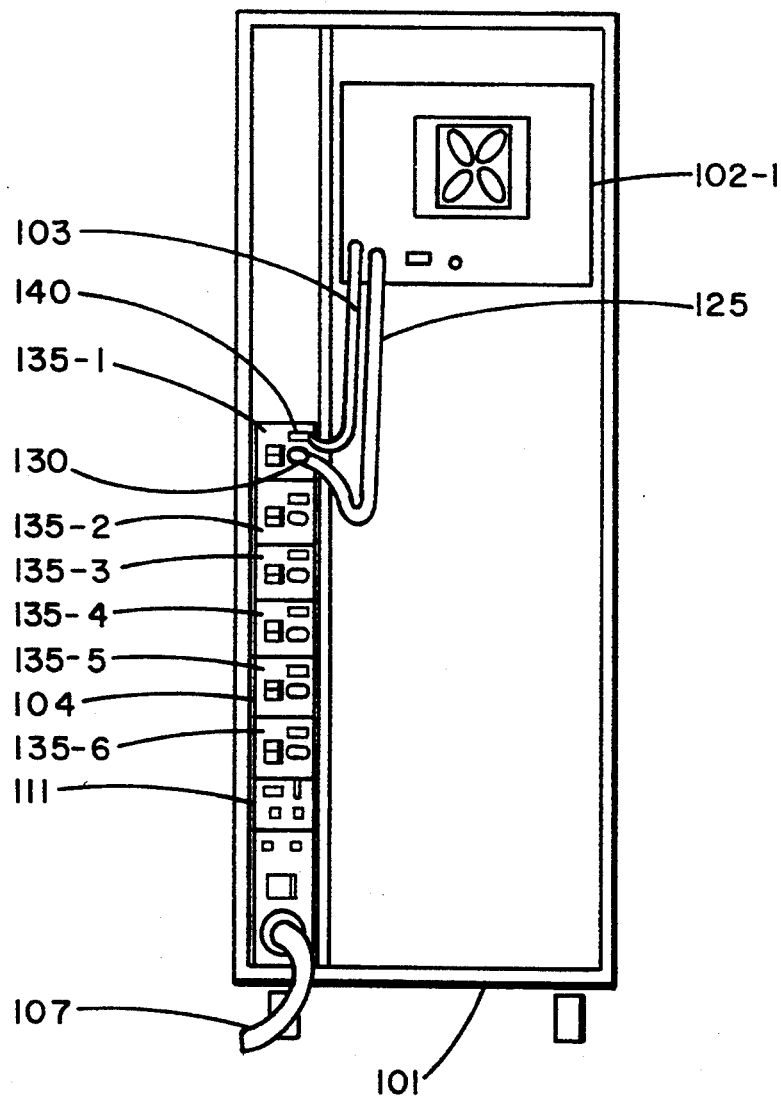

Reference should be made to FIGS. 1A and 1B which illustrate a front 100 and rear view 101, respectively, of an exemplary commercially available rack enclosure (the aforementioned IBM 9309 rack enclosure) that is shown to include rack mounted devices (102-1 through 102-6) containing BBUs.

In particular, FIGS. 1A and 1B depict how battery backed up devices, such as 102-1 through 102-6, are often mounted and connected in existing rack enclosures, such as illustrative IBM 9309 rack enclosure shown at 100. The IBM 9309 rack enclosure will be referred to frequently hereinafter, for the sake of illustration only in connection with the teaching of the invention.

With reference to rear view 101 of the illustrative rack shown in FIG. 1B, it may be seen how each rack mounted battery backed up device (sometimes referred to hereinafter simply as a "device"), is physically mounted in the rack enclosure and how it receives primary power (only one device is shown in rear view 101 for the sake of simplicity).

Each device (such as device 102-1 shown mounted in rack enclosure 101), receives primary power via a device power cable, such as cable 125 shown in FIG. 1B, coupled to an A.C. connector (connector 130) included in a device interface (such as interface 135-1), located in the Primary Control Compartment (PCC 104) of the rack. Each of the six depicted device interfaces (135-1 through 135-6) also include a DPO connector (such as DPO connector 140), to which a delayed power on (DPO) signal cable (like cable 103), shown connected to device 102-1, may be plugged.

As indicated hereinbefore, the particular non-specific rack signals utilized when practicing the invention in the context of an IBM 9309 rack enclosure are the IBM 9309 Primary Control Compartment (PCC) generated Delayed Power On (DPO) signal and the +5 volt PCC bias voltage signal, both described (together with the PCC itself) in the incorporated reference.

Suffice it to say for the purposes of describing the invention that (1) the DPO signal in the IBM 9309 rack enclosure is a delayed start signal output by the rack to rack mounted devices coupled (via a DPO signal cable) to the DPO connectors (such as, for example, DPO connector 140 shown in FIG. 1B to be located on device interface 135-1; (2) that the DPO signal is used to prevent high in-rush line current to the rack enclosure; (3) a PCC, like PCC 104, is an intelligent power controller that outputs the DPO signal for sequentially turning on the rack mounted devices; (3) the aforementioned +5 volt PCC bias voltage signal (also output by the rack to each DPO connector in the IBM 9309 rack enclosure) may be used to override the DPO signal to thereby modify or even eliminate the previously mentioned sequencing process; and (4) there are no direct interface signals in the IBM 9309 Rack Enclosure to control BBUs located in devices installed in the rack.

Clearly, both the DPO signal and the +5 volt PCC bias voltage signal (in the IBM 9309 context), qualify as "non-specific" rack signals since these signals are being generated by the rack and have been used heretofore only for purposes other than device level BBU switching.

FIG. 1B also shows the entire rack being powered by main power cable 107, coupled to utility power or an uninterruptible power supply (UPS), not shown; and interface 111 which may be used, for example, to interconnect racks. Interface 111 is not used by the control circuitry which is the subject of the instant invention.

According to a preferred embodiment of the invention, the circuitry contemplated by one aspect of the invention (the novel battery back-up control circuitry), may be located on the charger/control card normally included as part of a standard rack mounted device containing a BBU.

Figure 2:
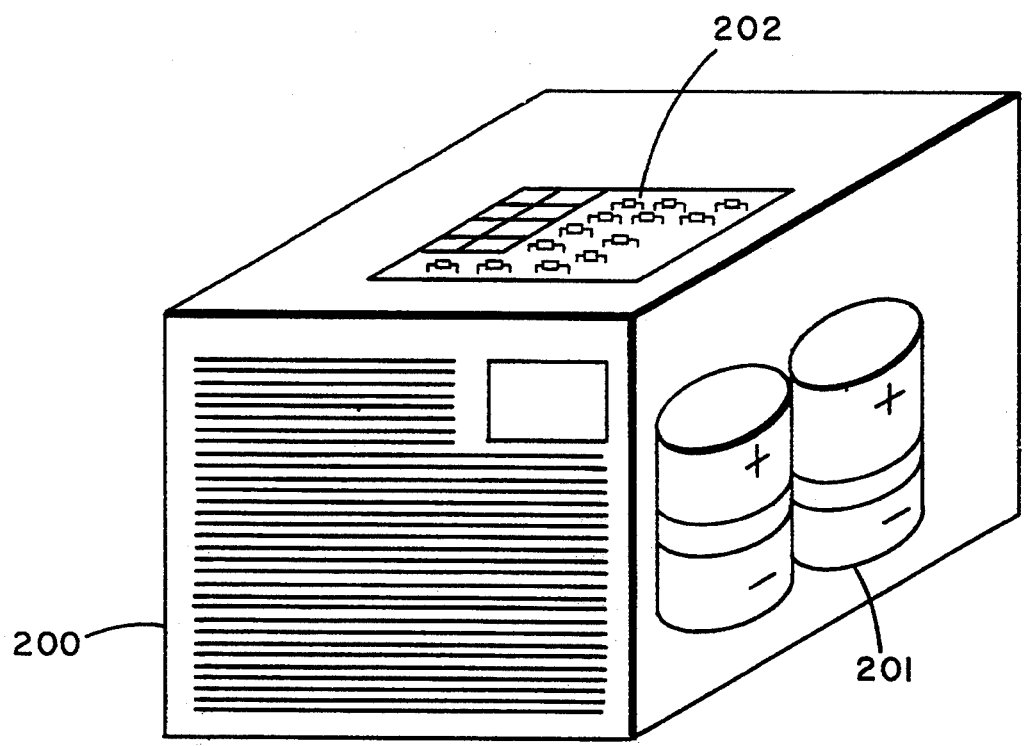
FIG. 2 illustrates an example of a prior art rack mounted device that contains a BBU and a BBU control card.

In particular, reference should now be made to FIG. 2 which illustrates a battery backed up device (200), shown to include battery pack 201 and charger/control card 202. The charger/control card is typically used to couple an external charger to restore depleted battery power.

Figure 3:
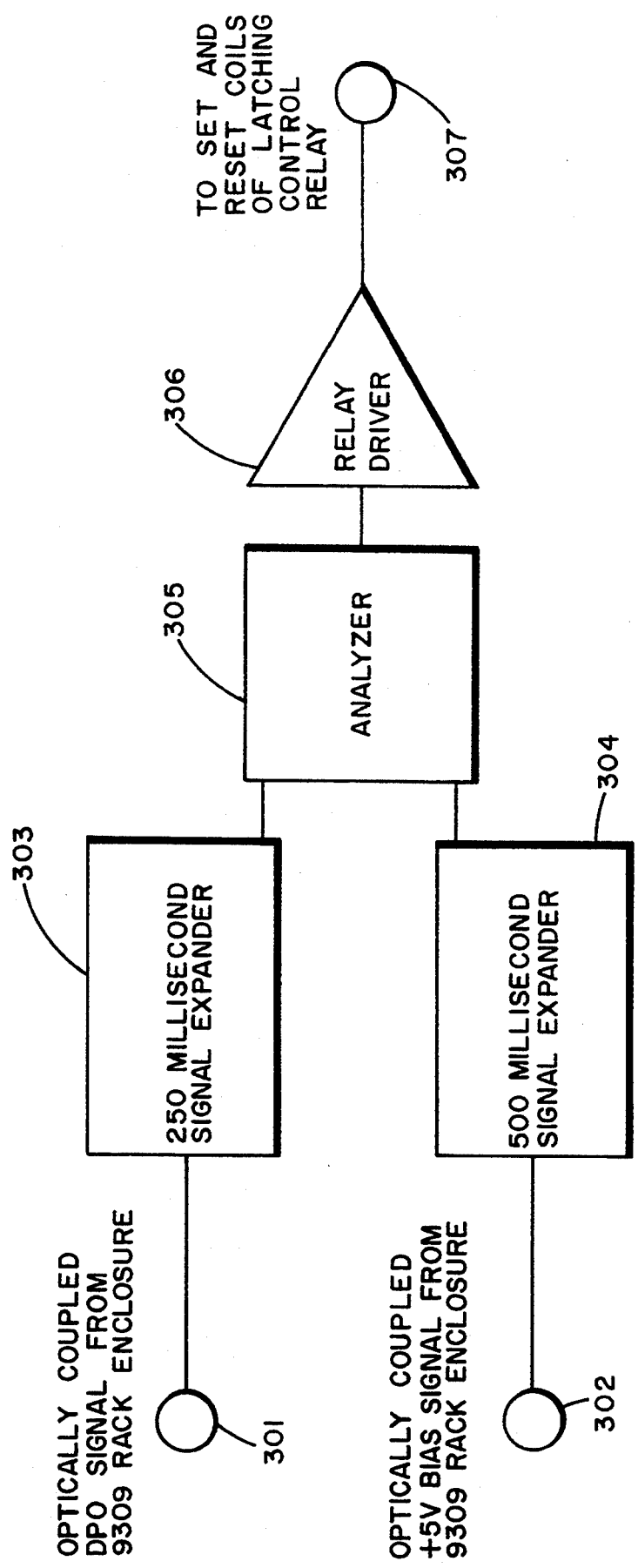
FIG. 3 illustrates, in the form of a functional block diagram, one embodiment of battery back-up control circuitry contemplated by the invention.

Referring now to FIG. 3, one embodiment of battery back-up control circuitry contemplated by the invention may be seen illustrated in functional block diagram form.

It should be recalled that there are no direct interface signals in the IBM 9309 Rack Enclosure to control BBUs located in devices installed in the rack.

A control circuit which functions in accordance with the block diagram depicted in FIG. 3 can be adapted to any battery backed up device. It will allow a device's BBU to be controlled under utility power outages, normal power off, and emergency power off (EPO) situations in the exemplary IBM 9309 Rack Enclosure.

More particularly, a control circuit that functions in the manner depicted in FIG. 3 can be used to distinguish between an EPO, normal power off, or utility outage. Without the control circuit, devices installed in and powered by a rack (such as the IBM 9309 Rack) will remain powered until their batteries are exhausted during an EPO or normal power down.

The circuitry depicted in block diagram form in FIG. 3 makes use of the Rack DPO signal and the +5 volt bias voltage signal, which are shown as optically coupled inputs to the novel BBU control circuitry at 301 and 302 of FIG. 3, respectively. These signals are processed by the depicted expander sections (303 and 304) of the circuit as their states change.

The state changes are a result of the power environment, i.e., EPO, utility power outage, normal power down. In the case of the DPO signal, as indicated hereinbefore, it changes state whenever a rack A.C. power outage, rack EPO or normal rack power down condition exists. The aforementioned +5 volt bias voltage signal changes state only when an A.C. power outage condition exists.

The signals expanders depicted in FIG. 3 are shown, in accordance with a preferred embodiment of the invention, to be a 250 millisecond expander (for expander 303), and a 500 millisecond expander (for expander 304), respectively. The signal expansion time t1, associated with expander 303, and the signal expansion time t2 associated with expander 304, are, according to the invention, to be chosen such that t1 is less than t2, and such that signal expanders 303 and 304 serve as a mechanism to eliminate any race conditions among the DPO signal and the +5 volt bias voltage signal (constituting the set of non-specific rack signals being processed in the illustrative embodiment of the invention), under A.C. power outage conditions. This function of the expanders will be explained in greater detail hereinafter with reference to FIGS. 4A, 4B and 4C.

The analyzer section of the novel control circuit, shown at 305 in FIG. 3, determines the cause of the rack signal (e.g., DPO and bias signal) state changes. If a normal power down or EPO were the cause of the signal state change, the batteries are taken off-line by the novel control circuitry. This may be accomplished via a latching type relay 307, shown under the control of relay drive circuitry 306 in FIG. 3. In the case of a utility outage, the batteries are, according to the invention, to be kept on-line.

Figure 4A:
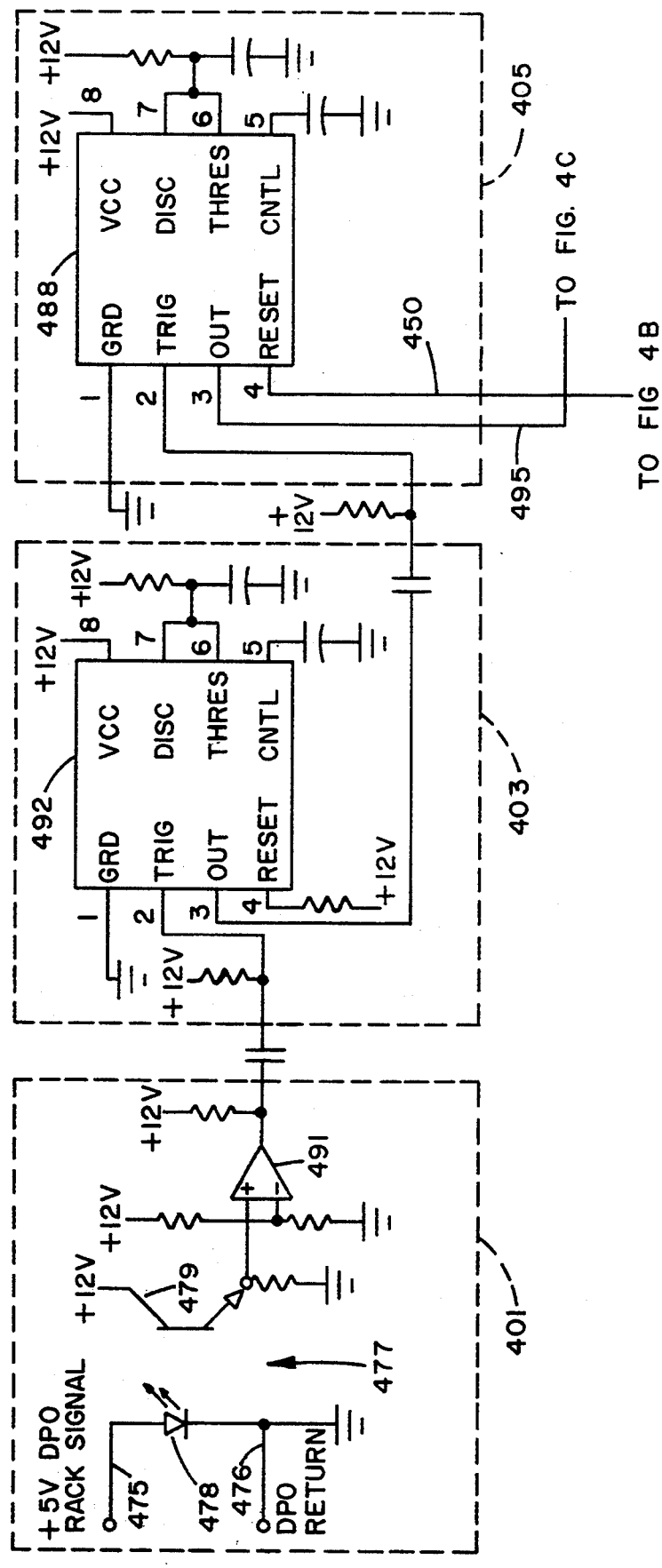
FIGS. 4A, 4B and 4C illustrate in schematic form, the circuit details of one embodiment of the invention with the depicted circuit components being arranged to perform the functions depicted by the illustrative block diagram shown in FIG. 3.
Figure 4B:
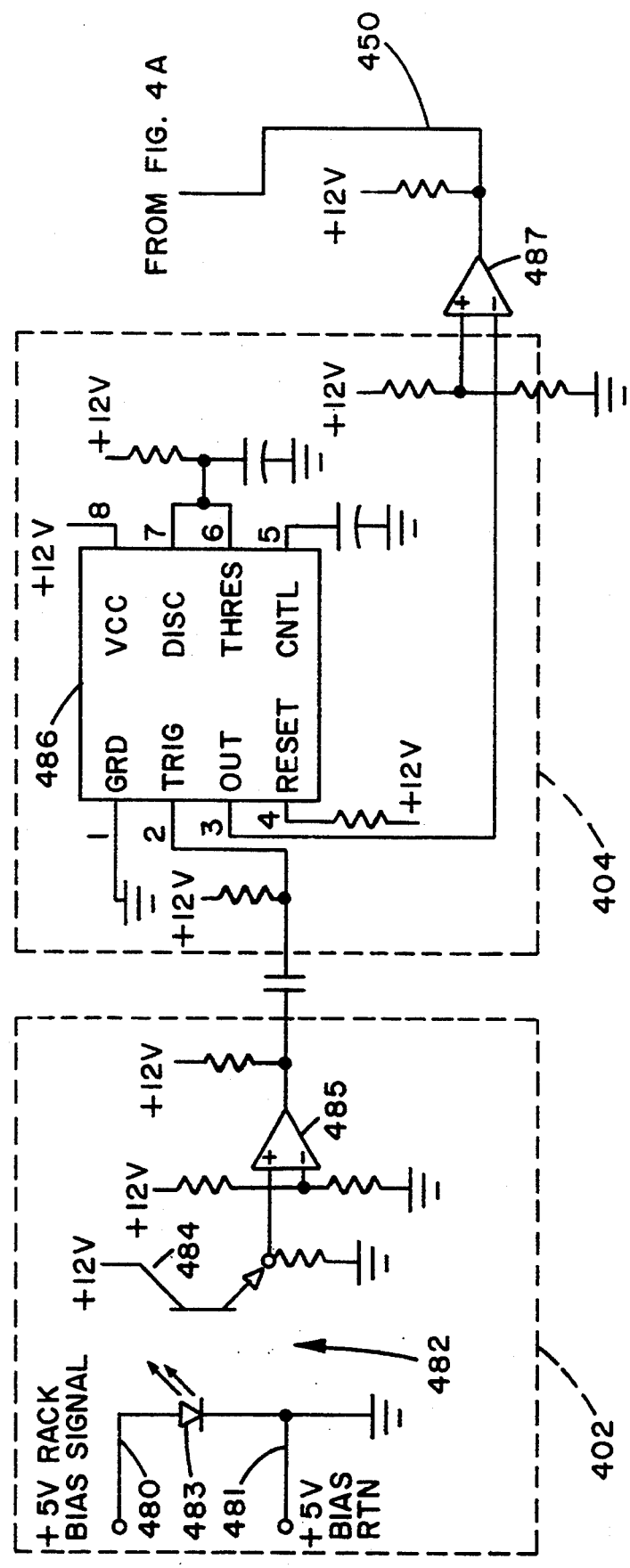
Figure 4C:
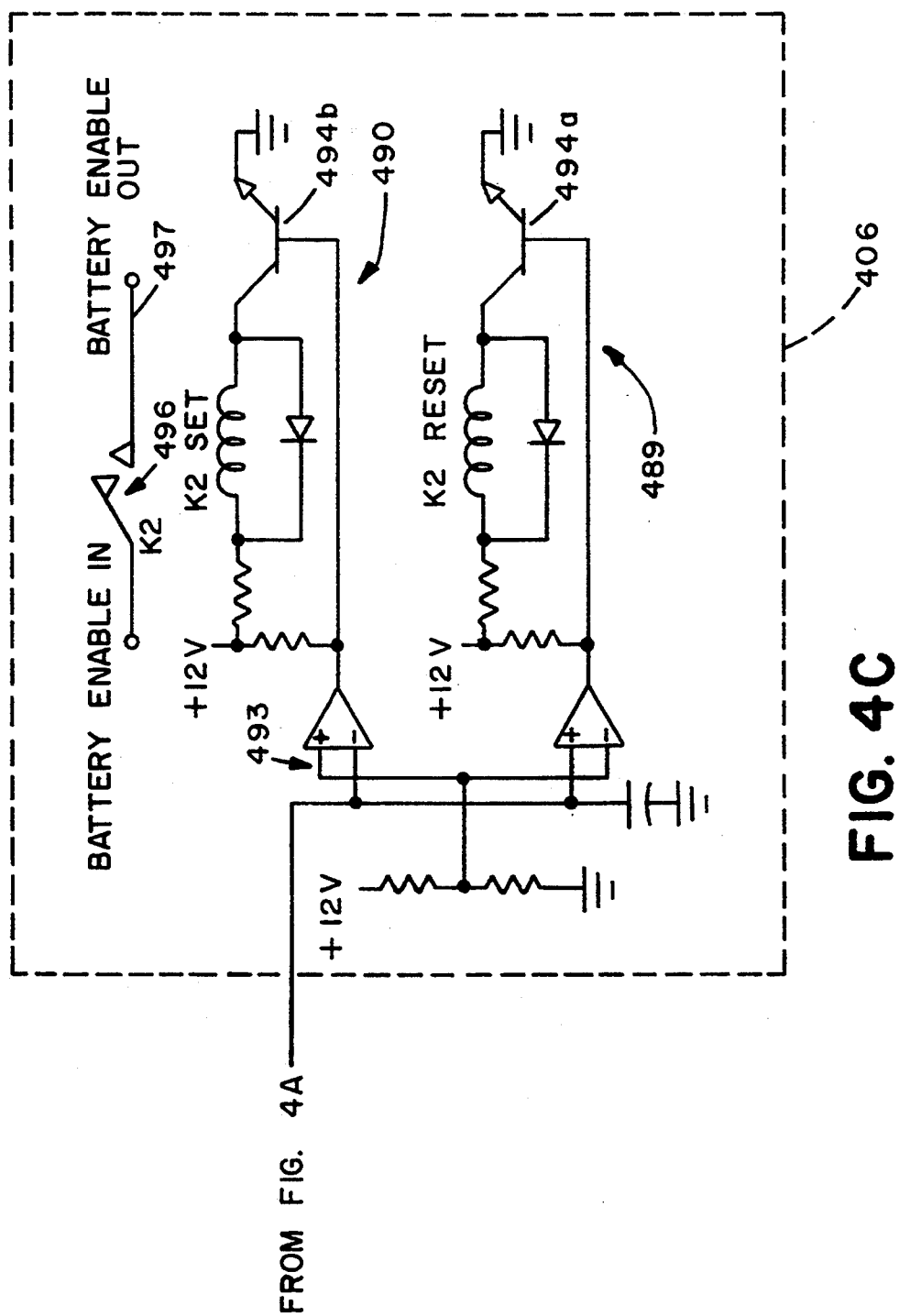

Reference should now be made to FIGS. 4A, 4B and 4C which illustrate, in schematic form, the circuit details of one embodiment of the invention with the depicted circuit components being arranged to perform the functions depicted by the illustrative block diagram shown in FIG. 3.

As indicated hereinbefore with reference to FIG. 3 (and as explained in the incorporated reference), in the illustrative IBM 9309 Rack an optically coupled +5 volt signal (the DPO signal generated by the rack) may connected into the control circuitry contemplated by the invention from the rack's Primary Control Compartment (PCC).

Also optically coupled from the rack (as further indicated in FIG. 3) is the PCC +5 volt bias voltage signal. This signal is used, as explained in the incorporated reference and indicated hereinabove, for the Fast Start Jumper feature of the IBM 9309.

Means for optically coupling the DPO signal and +5 volt bias voltage signal (depicted functionally as optically coupled inputs (301 and 302 respectively) to the BBU control circuitry contemplated by the invention in FIG. 3), are shown at blocks 401 and 402 respectively, of FIGS. 4A and 4B.

In particular, block 401 of FIG. 4A, shows, in accordance with one embodiment of the invention, the DPO signal on link 475 (and return link 476), taken from a DPO connector (not shown), being optically coupled in the novel control circuit by opto-isolator 477. Opto-isolator 477 is shown in FIG. 4A to include photodiode 478 and phototransistor 479.

Similarly, block 402 of FIG. 4B shows, in accordance with one embodiment of the invention, the +5 volt bias voltage signal on link 480 (and return link 481), taken from a DPO connector (not shown), being optically coupled in the novel control circuit by opto-isolator 482. Opto-isolator 482 is shown in FIG. 4B to also include the combination of a photodiode (483) and phototransistor (484).

In principal, as indicated hereinabove, whenever a Rack EPO is initiated the DPO line is immediately pulled low. This is also the case during a normal rack power down during which the DPO line is pulled low when the power off signal is initiated from the rack. In each instance the +5 volt bias voltage signal remains active. Only under an A.C. power outage will both the DPO signal and the +5 volt bias voltage signal be lost.

The +5 volt bias voltage signal coupled, according to a preferred embodiment of the invention, to the BBU control circuit as shown in block 402 (as explained hereinabove), is subsequently applied to a comparator (such as, for example, ¼ of a commercially available LM339 comparator as shown in FIG. 4B at 485), whose inverting input is referenced (according to the illustrative embodiment of the invention) at +12 volts.

The output of comparator 485 is shown in FIG. 4B to be A.C. coupled to the trigger of a single shot timer which, as indicated hereinbefore, is set for approximately 500 milliseconds. The single shot timer is shown included in 500 millisecond signal expander 404 (in FIG. 4B), and may be realized by using a commercially available NE555 timer, shown at 486 in FIG. 4B. Each of the timers referred to herein may be set, as is well known by those skilled in the art, using the RC networks coupled to pins 6 and 7 of a NE555 timer (as shown in FIGS. 4A and 4B for each depicted timer), choosing appropriate values for R and C.

The output of timer 486 is, according to the invention, compared, via comparator 487, to the aforementioned reference voltage, with the output of comparator 487 being connected to the reset of another single shot (timer 488 shown included in analyzer 405), the output of which (on link 495) controls the setting and resetting of a latching relay 490, via rely driver 489, both included in the relay driver and latching relay circuitry shown at 406 in FIG. 4C. Latching relay 490's contacts are shown in FIG. 4C (at 496) to be configured in line with the device's battery enable line, 497.

The DPO signal coupled, according to a preferred embodiment of the invention, to the BBU control circuit as shown in block 401 (as explained hereinabove), is also subsequently applied to a comparator (such as, for example, ¼ of a commercially available LM339 comparator as shown in FIG. 4A at 491), whose inverting input is referenced (according to the illustrative embodiment of the invention) at +12 volts. In block 401 the output of comparator 491 is connected to still another single shot timer (timer 492 shown in block 403) which, according to the illustrative embodiment of the invention, is set at approximately 250 milliseconds.

The output of timer 492 is, according to a preferred embodiment of the invention, used in a sequential timer configuration along with the single shot timer (timer 488 in analyzer 405) that controls relay driver 489 and latching relay 490.

As indicated hereinbefore, the 250 and 500 millisecond timers provide a signal shift of both applied rack signals. This eliminates any race conditions of the rack signals under A.C. outages that are possible.

It should be noted (and those skilled in the art will appreciate) that the DPO and +5 volt bias voltage signals could not be used as provided directly from the rack to distinguish the power down or power loss signals. By processing the signals with the subject circuitry, invalid conditions are avoided. As an example, if the +5 volt bias voltage signal and the DPO signal were used as provided by the rack, to signal a battery active, a power loss occurring during a normal power down of the rack may cause the device to go on battery power. An error of this type may happen since the signal state changes are also a function of the PCC box power supply load and the type of primary power outage. For this reason, the aforementioned expanders are used to prevent such problems.

FIG. 4C also shows relay drive circuitry 489 (coupled to the output of timer 488), to include, according to the illustrative embodiment of the invention, a comparator network 493 which is shown in block 406 of FIG. 4C to be connected to two driver transistors (494a and 494b) arranged in a Flip-Flop configuration. Timer 488 is, according to a preferred embodiment of the invention, set for a time delay of approximately 60 seconds to assure that latching relay 490 remains reset during the approximately 37 second normal rack power down sequence experienced in the illustrative IBM 9309 rack environment.

Utilizing the circuitry depicted in FIGS. 4A, 4B and 4C, under rack EPO or normal rack power down conditions, the 250 millisecond timer (timer 492 as shown in FIG. 4A) is triggered. Since the PCC +5 volt bias voltage signal is still active under these conditions, the 500 millisecond timer (timer 486 as shown in FIG. 4B), is not triggered. Thus, the reset pin of the output timer (timer 488 as shown in FIG. 4A), is held high allowing it to trigger. When the 250 ms single shot (timer 492) has timed out, it triggers the output timer (timer 488) and causes relay drive circuitry 489 to reset latching relay 490. According to the illustrative embodiment of the invention being set forth herein, the BBU is deactivated when latching relay 490 is reset.

During an A.C. power outage, both the DPO and +5 volt bias voltage signal lines eventually drop. Both the 250 and 500 ms timers (timers 492 and 486, respectively) are triggered. As the timer 492 (the 250 ms single shot) times out, timer 486 (the 500 ms timer) is still holding the reset (shown at 450) of output timer 488, low. This prevents output timer 488 from triggering and the BBU remains active.

Once again, as indicated hereinbefore, the 500 ms timer (timer 488) is used as an event trap. If the +5 volt bias signal voltage drops for any reason after the DPO signal has been lost and is being processed, output timer 488 is deactivated. In this situation, the circuit contemplated by the invention is designed to keep the BBU on line.

Finally, with respect to FIGS. 4A, 4B and 4C it should be noted that, according to a preferred embodiment of the invention, all of the depicted timers (486, 488 and 492), are normally reset during power up of the device causing latching relay 490 to be in the set mode corresponding to the BBU active state.

Figure 5:
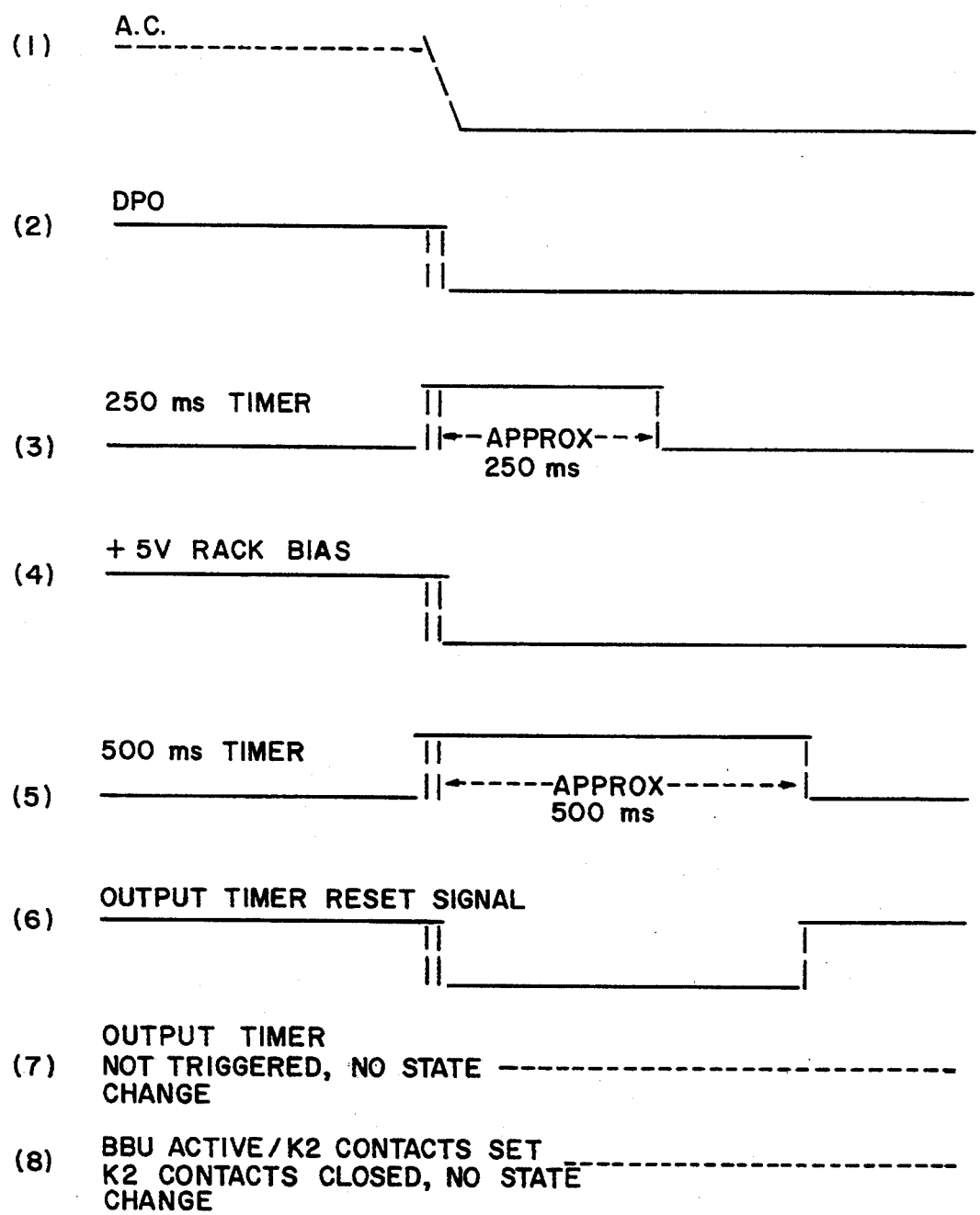
FIG. 5 illustrates, in the form of a time oriented state diagram, the various states for control circuitry depicted in FIG. 4, resulting from a rack A.C. power loss condition.

Reference should now be made to FIG. 5 which illustrates, in the form of a time oriented state diagram, the various states for control circuitry depicted in FIGS. 4A, 4B and 4C resulting from a rack A.C. power loss condition.

FIG. 5 shows that the DPO signal, shown on line (2) of FIG. 5, falls when a rack A.C. power loss occurs. The rack A.C. power loss is seen as an A.C. power loss to the device itself as indicated on line (1) of FIG. 5. The DPO signal loss results in the aforementioned 250 millisecond timer (timer 492 in FIG. 4A) being triggered as shown on line (3) of FIG. 5.

Since an A.C. power outage condition is being experienced by the rack, the +5 volt bias voltage signal is also lost, as shown on line (4) of FIG. 5. This event triggers the aforementioned 500 millisecond timer (timer 486 in FIG. 4A), which holds output timer 488's reset low until after the aforementioned 250 millisecond timer has timed out, as shown on lines (5), (6) and (3), respectively, in FIG. 5.

As a result, output timer 488 is never triggered, as shown in line (7) of FIG. 5, and the BBU remains in the active state permitting the BBU to supply power the device being backed up, as shown in line (8) of FIG. 5.

Finally, reference should now be made to FIG. 6 which illustrates, in the form of a time oriented state diagram, the various states for control circuitry contemplated depicted in FIGS. 4A, 4B and 4C resulting from either a rack EPO condition or normal rack power down condition.

FIG. 6 shows the DPO signal falling, shown on line (1) of FIG. 6, in response to a rack EPO condition or normal rack power off condition. Even though A.C. power is still normally being provided to the rack under these conditions, line (2) of FIG. 6 shows A.C. power (from the perspective of the device control circuit) being lost to the device itself, which is exactly what happens when a rack EPO condition or normal rack power off condition has been initiated. As a consequence, for the reasons set forth hereinbefore, it is in these instances desirable to deactivate the BBU associated with each battery backed up device mounted in the rack.

FIG. 6 goes on to show that as a result of the DPO signal falling, the aforementioned 250 millisecond timer (timer 492 in FIG. 4A) is triggered, as shown on line (3) of FIG. 6. However, since A.C. power continues to be provided to the rack, the +5 volt bias voltage signal is not lost (just the opposite of the situation that occurred in the explanation of FIG. 5), and hence the aforementioned 500 millisecond timer (timer 486 in FIG. 4B), is not triggered, as indicated on line (4) of FIG. 6.

As a result, the reset pin of the output timer (timer 488 as shown in FIG. 4A), is held high allowing output timer 488 to trigger when the 250 ms single shot (timer 492) has timed out, as shown on line (5) of FIG. 6. As indicated hereinabove, this causes relay drive circuitry 489 to reset latching relay 490. According to the illustrative embodiment of the invention being set forth herein, the BBU is deactivated when latching relay 490 is reset, with the relay contacts opening as indicated on line (6) of FIG. 6.

FIG. 6 also indicates output timer 488 is set for a time delay of approximately 60 seconds (as explained hereinbefore) to assure that the relay remains reset during the approximately 37 second normal rack power down sequence in the exemplary IBM 9309 rack enclosure, or until the devices bulk capacitor in the D.C. power supply has decayed.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. Apparatus for controlling a battery back-up unit (BBU) associated with a rack mounted device under rack A.C. power outage, rack Emergency Power Off (EPO) and normal rack power down conditions, comprising:
    (a) means for distinguishing between the rack A.C. power outage, and both the rack Emergency Power Off (EPO) and the normal rack power down conditions;
    (b) means for deactivating the BBU, coupled to said means for distinguishing, whenever a rack EPO or normal rack power down condition exists;
    (c) means for receiving a set of non-specific rack signals generated by the rack;
    said means for distinguishing further comprising
    means for monitoring the set of non-specific rack signals, including a first signal which changes state whenever a rack A.C. power outage, rack EPO or normal rack power down condition exists, and a second signal which changes state only when an A.C. power outage condition exists, to detect any state changes in said set of non-specific rack signals; and
    means for determining, coupled to said means for monitoring, if a rack power condition exists that does not require battery back-up.

2. Apparatus as set forth in claim 1 wherein said means for deactivating said BBU further comprises a latching relay in line with said BBU.

3. Apparatus as set forth in claim 2 wherein said means for deactivating further comprises relay drive means, coupled to said latching relay and said means for determining, for controlling said latching relay.

4. Apparatus as set forth in claim 3 wherein said relay drive means resets said latching relay to deactivate said BBU whenever a rack power condition exists that does not require battery back-up.

5. Apparatus as set forth in claim 3 wherein said relay drive means sets said latching relay to permit said BBU to supply power to said device whenever a rack A.C. power outage condition exists.

6. Apparatus as set forth in claim 3 wherein said means for determining further comprises means for preventing possible race conditions associated with said set of non-specific rack signals.

7. Apparatus as set forth in claim 6 wherein said means for preventing possible race conditions further comprises signal expander means.

8. Apparatus as set forth in claim 7 wherein said means for determining further comprises means for analyzing, coupled to said expander means, for developing an output signal to control said relay drive means.

9. A method for controlling a battery back-up unit (BBU) associated with a rack mounted device under rack A.C. power outage, rack Emergency Power Off (EPO) and normal rack power down conditions, comprising the steps of:
    (a) receiving a set of non-specific rack signals generated by the rack;
    (b) monitoring the set of non-specific rack signals, including a first signal which changes state whenever a rack A.C. power outage, rack EPO or normal rack power down condition exists, and a second signal which changes state only when an A.C. power outage condition exists, to detect any state changes in said set of non-specific rack signals;
    (c) distinguishing between the rack A.C. power outage, and both the rack Emergency Power Off (EPO) and the normal rack power down conditions;

(d) determining if a rack power condition exists that does not require battery back-up; and (e) deactivating the BBU whenever a rack EPO or normal rack power down condition exists.

10. A method as set forth in claim 9 wherein said step of deactivating further comprises the step of utilizing a latching relay to deactivate said BBU.

11. A method as set forth in claim 10 wherein said step of deactivating further comprises the step of utilizing relay drive means for controlling said latching relay to deactivate said BBU whenever a rack power condition exists that does not require battery back-up.

12. A method as set forth in claim 9 further comprising the step of permitting said BBU to supply power to said device whenever a rack A.C. power outage condition exists.

13. A method as set forth in claim 9 wherein said step of determining further comprises the step of preventing possible race conditions associated with said set of non-specific rack signals.

14. A method as set forth in claim 13 wherein said step of preventing possible race conditions further comprises the step of delaying the processing of said set of non-specific rack signals in performing said step of determining.

15. A method as set forth in claim 14 wherein said step of determining further comprises the step of analyzing the delayed set of non-specific rack signals to develop an output signal to control said relay drive means.

16. A battery back-up unit (BBU) control circuit for controlling the BBU portion of a battery backed up device mounted in a rack enclosure, under rack A.C. power outage, rack Emergency Power Off (EPO) and normal rack power down conditions, wherein a set of non-specific rack signals, including a first non-specific signal which changes state whenever a rack A.C. power outage, rack EPO or normal rack power down condition exists, and a second non-specific signal which changes state only when an A.C. power outage condition exists, are generated within said rack enclosure, comprising:

(a) means for coupling a first state signal to first signal expander means whenever said first non-specific signal changes state;

(b) means for coupling a second state signal to second signal expander means whenever said second non-specific signal changes state;

c) first signal expander means, responsive to said first state signal, for outputting a first analyzer control signal after time t1;

(d) second signal expander means, responsive to said second state signal, for outputting a second analyzer control signal after time t2, where t1 is less than t2;

(e) analyzer means, responsive to said first and second analyzer control signals, for developing a first output signal to deactivate said BBU whenever a rack EPO or normal rack power down condition exists, and for developing a second output signal for permitting said BBU to supply power to said device whenever a rack A.C. power outage condition exists; and (f) BBU control means, coupled to said analyzer means, for deactivating said BBU in response to said first output signal and for permitting said BBU to supply power to said device in response to said second output signal.

17. A battery back-up unit (BBU) control circuit as set forth in claim 16 wherein said means for coupling said first state signal further comprises:

(a) an opto-isolator coupled to said first non-specific rack signal; and (b) comparator means, coupled to said opto-isolator, biased to detect any state change in said first non-specific rack signal.

18. A battery back-up unit (BBU) control circuit as set forth in claim 16 wherein said means for coupling said second state signal further comprises:

(a) an opto-isolator coupled to said second non-specific rack signal; and (b) comparator means, coupled to said opto-isolator, biased to detect any state change in said second non-specific rack signal.

19. A battery back-up unit (BBU) control circuit as set forth in claim 16 wherein said first signal expander further comprises a first single shot timer which expires, when set, after time interval t1.

20. A battery back-up unit (BBU) control circuit as set forth in claim 19 wherein said second signal expander further comprises a second single shot timer which expires, when set, after time interval t2.

21. A battery back-up unit (BBU) control circuit as set forth in claim 20 wherein t1 and t2 are chosen so that said first and second signal expanders serve as an event trap to eliminate any race conditions among said set of non-specific rack signals under A.C. power outage conditions.

22. A battery back-up unit (BBU) control circuit as set forth in claim 20 wherein said analyzer means further comprises a third single shot timer having its trigger coupled to the output of said first single shot timer and having its reset coupled to comparator means in series with the output of said second single shot timer, wherein said comparator means is in series with the output of said second single shot timer and is biased to detect any state change in said second single shot timer output signal.

23. A battery back-up unit (BBU) control circuit as set forth in claim 22 wherein the output of said third single shot timer is coupled to said BBU control means to thereby supply said BBU control means with said first output signal whenever said third single shot timer output is in a first state, and to alternatively supply said BBU control means with said second output signal whenever said third single shot timer output is in a second state.

24. A battery back-up unit (BBU) control circuit as set forth in claim 23 wherein said BBU control means further comprises:

(a) a relay driver, responsive to said first and second output signals to control a latching relay; and (b) a latching relay, coupled to and under the control of said relay driver, for deactivating said BBU in response to said first output signal and for permitting said BBU to supply power to said device in response to said second output signal.

25. A battery back-up unit (BBU) control circuit as set forth in claim 23 wherein said relay driver further comprises a comparator network coupled to a pair of drive transistors arranged in a Flip-Flop configuration.

26. A battery back-up unit (BBU) control circuit as set forth in claim 23 wherein said third single shot timer expires, when set, after time interval t3, where t3 is chosen to assure that said latching relay remains reset during a normal rack power down sequence.

* * * * *